(12) United States Patent
Richards et al.

(10) Patent No.: US 6,728,700 B2
(45) Date of Patent: *Apr. 27, 2004

(54) NATURAL LANGUAGE HELP INTERFACE

(75) Inventors: Jonathan B. Richards, Lawrenceville, GA (US); Joseph W. Guthridge, III, Atlanta, GA (US); William H. Jones, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/304,461

(22) Filed: May 3, 1999

(65) Prior Publication Data

US 2002/0165862 A1 Nov. 7, 2002

Related U.S. Application Data

(63) Continuation of application No. 08/636,663, filed on Apr. 23, 1996, now Pat. No. 5,995,921.

(51) Int. Cl.$^7$ .............................................. G06F 17/30
(52) U.S. Cl. .................. 707/3; 707/4; 707/102
(58) Field of Search .................. 707/1–10, 100–104.1; 205/9; 345/707, 708, 705

(56) References Cited

U.S. PATENT DOCUMENTS

| | | | | |
|---|---|---|---|---|
| 4,965,763 A | * | 10/1990 | Zamora | 704/1 |
| 5,265,065 A | * | 11/1993 | Turtle | 707/4 |
| 5,278,980 A | * | 1/1994 | Pedersen et al. | 707/4 |
| 5,377,103 A | * | 12/1994 | Lamberti et al. | 704/9 |
| 5,418,948 A | * | 5/1995 | Turtle | 707/4 |
| 5,454,106 A | * | 9/1995 | Burns et al. | 707/4 |
| 5,488,725 A | * | 1/1996 | Turtle et al. | 707/5 |
| 5,493,677 A | * | 2/1996 | Balogh et al. | 707/104.1 |
| 5,535,323 A | * | 7/1996 | Miller et al. | 345/707 |
| 5,576,954 A | * | 11/1996 | Driscoll | 707/3 |
| 5,581,684 A | * | 12/1996 | Dudzik et al. | 345/708 |
| 5,592,668 A | * | 1/1997 | Harding et al. | 707/2 |
| 5,680,628 A | * | 10/1997 | Carus et al. | 704/1 |
| 5,694,559 A | * | 12/1997 | Hobson et al. | 345/705 |
| 5,696,962 A | * | 12/1997 | Kupiec | 707/4 |
| 5,724,571 A | * | 3/1998 | Woods | 707/5 |
| 5,781,904 A | * | 7/1998 | Oren et al. | 707/100 |
| 5,794,178 A | * | 8/1998 | Caid et al. | 704/9 |
| 5,873,056 A | * | 2/1999 | Liddy et al. | 704/9 |
| 5,875,446 A | * | 2/1999 | Brown et al. | 707/3 |
| 5,933,822 A | * | 8/1999 | Braden-Harder et al. | 707/5 |
| 5,935,207 A | * | 8/1999 | Logue et al. | 709/203 |
| 5,991,756 A | * | 11/1999 | Wu | 707/3 |
| 5,995,921 A | * | 11/1999 | Richards et al. | 704/9 |
| 5,995,956 A | * | 11/1999 | Nguyen | 706/54 |
| 6,016,504 A | * | 1/2000 | Arnold et al. | 705/26 |
| 6,026,388 A | * | 2/2000 | Liddy et al. | 707/1 |
| 6,028,601 A | * | 2/2000 | Machiraju et al. | 345/705 |

(List continued on next page.)

Primary Examiner—Greta Robinson
Assistant Examiner—Debbie M. Le
(74) Attorney, Agent, or Firm—Kudirka & Jobse, LLP; Stephen Koehane

(57) ABSTRACT

A help interface capable of receiving user-defined queries in a natural language and selecting the most appropriate answer from a plurality of potential answers, includes facilities for parsing and storing the character string content of the query in a buffer. Lists of punctuation characters as well as single and multiple word character strings are successively compared with the content of the buffer to eliminate punctuation, superfluous words, location reference words, and to identify synonyms to base words meaningful in the selection of an appropriate answer. The identified base words are used as references into a predefined rule set which inherently matches the base word with a potential answer and assigns a value based on the relationship of the potential answer to the base word. The cumulative values of all potential answers are computed and ranked with the highest ranking value presented to the user as a response to the query.

25 Claims, 6 Drawing Sheets

U.S. PATENT DOCUMENTS

| | | | | |
|---|---|---|---|---|
| 6,038,560 A | * | 3/2000 | Wical | 707/5 |
| 6,041,323 A | * | 3/2000 | Kubota | 707/3 |
| 6,078,914 A | * | 6/2000 | Redfern | 707/3 |
| 6,081,774 A | * | 6/2000 | de Hita et al. | 704/9 |
| 6,105,023 A | * | 8/2000 | Callan | 707/5 |
| 6,128,613 A | * | 10/2000 | Wong et al. | 707/7 |
| 6,173,279 B1 | * | 1/2001 | Levin et al. | 707/5 |
| 6,256,623 B1 | * | 7/2001 | Jones | 707/3 |
| 6,263,335 B1 | * | 7/2001 | Paik et al. | 705/5 |
| 6,269,368 B1 | * | 7/2001 | Diamond | 707/6 |
| 6,363,378 B1 | * | 3/2002 | Conklin et al. | 707/5 |
| 6,366,910 B1 | * | 4/2002 | Rajaraman et al. | 707/5 |
| 6,513,031 B1 | * | 1/2003 | Fries et al. | 707/3 |

* cited by examiner

| PUNCTUATION LIST 214 |
|---|
| ? |
| " |
| ! |
| ... |

*FIG. 4A*

| NOISE LIST 215 |
|---|
| IT |
| THE |
| THAT |
| THIS |
| ... |

*FIG. 4B*

| LOCATION LIST 216 | |
|---|---|
| FROM FRAME | LOCATION |
| TO TABLE | LOCATION |
| TO IMAGE | LOCATION |
| ... | |

*FIG. 4C*

| MASTER WORD LIST 218 | | |
|---|---|---|
| GET RID OF | WORD NO. | VERB |
| TAKE OUT | WORD NO. | VERB |
| DELETE | WORD NO. | VERB |
| ... | | |

*FIG. 4D*

| BASE WORD LIST | | |
|---|---|---|
| DELETE | WORD NO. | VERB |
| FRAME | WORD NO. | VERB |
| PAGE | WORD NO. | VERB |
| ... | | |

| ANSWER NO. | ANSWER NO. | BEST CHOICE |
|---|---|---|
| | .... | |

TIE ARRAY
225

*FIG. 5C*

| ANSWER NO. | SUM |
|---|---|
| | .... |

RANKING ARRAY
224

*FIG. 5B*

NATURAL LANGUAGE HELP INTERFACE

RELATED APPLICATIONS

This application is a continuation of, and claims priority to, commonly assigned U.S. patent application Ser. No. 08/636,663, filed Apr. 23, 1996, and entitled "NATURAL LANGUAGE HELP INTERFACE", now U.S. Pat. No. 5,995,921.

FIELD OF THE INVENTION

The present invention relates, in general, to data processing systems, and more specifically, to a data processing system having a help interface in which a user can query the system using a natural language.

BACKGROUND OF THE INVENTION

Numerous software applications, utilities, games, operating systems, etc., are designed to have some type of user assistance or "help" facility designed integrally within the software. Such help facilities, to a limited extent, enable the user to obtain instructional information while using the software and are less disruptive, and, typically less time consuming, than searching through manuals or other documentation accompanying the software.

Current help interfaces mimic one of a few basic designs. A first design, the limited context sensitive help interface utilizes the "context" or location of the user in the software to determine the nature and format of the help information to be displayed. For example, in a word processing application, if the user is editing a document and selects a command such as "FILE" from the drop-down menu and further presses a function key such "F1" for HELP, a limited context-sensitive facility opens a window explaining the functions offered under the drop-down menu. Unfortunately, users often have questions of a general nature which are unrelated to their current context or location. In such instances a context-sensitive help interface is of little or no value.

A second design, the table of contents/indexing help interface is formatted similarly to the table of contents or index of a document. Although this design does not limit the user to topics which are specific to the current context of the user's activities, the value of such an interface is dependent on the number and accuracy of entries contained therein. In addition, table of contents/indexing type interfaces are difficult and time consuming to build and rarely include all the topics to which a user is seeking a greater understanding. A further disadvantage of the table of contents/indexing type help interfaces is that users often seek information using words, phrases, and terminology of their own natural language, which although familiar to the user, are often different than those used by the author of the help interface. Both of the above-described help interfaces are not truly user interactive.

Artificial intelligence systems exist which accept natural language queries. However, such systems are usually very large and complex and, therefore, unsuitable for implementation with either an application or an operating system, where size is a primary consideration. Further, such systems have typically been unable to successfully answer a sufficient number of questions to make them useful. In addition, complex artificial intelligence systems are not amenable to "localization," i.e., the porting or translation of the software to adapt to a different natural language from that for which it was developed.

Accordingly, a need exists for a help interface for use with software which allows users to ask questions and make inquiries about topics unrelated to their current context or location within the software. Further, a need exists for a help interface in which the user may query the help facility using words, phrases and terminology of the user's natural language. An additional need exists for a help interface capable of effectively answering natural language queries and which is compact enough to be implemented in an application or operating system. A further need exists for a natural language help interface which may be easily localized to other natural languages without significantly redesigning the interface.

It is therefore an object of the present invention to provide an improved help interface through which users can interact with software.

SUMMARY OF THE INVENTION

The above and other objects are achieved with an inventive help interface which is capable of receiving user-defined queries in a natural language. The user-defined query is read into a buffer and parsed to delineate the character string content. Lists of punctuation characters and single and multiple word character strings are successively compared with the contents of the buffer, to eliminate punctuation, superfluous words, and location reference words, as well as to identify key words within the user-defined character string. The identified key words are used as references into a predefined rule set which inherently matches the identified words with potential answers and assigns a value to a potential answer. The cumulative values of the potential answers are computed and ranked. The answer with the highest ranking value is presented to the user in response to the query.

In accordance with one embodiment, the present invention discloses a computer system having a user interface for receiving user-defined queries and a memory for storing a plurality of predefined information segments. The computer system further contains apparatus responsive to the user-defined query for selecting one of the predefined information segments which corresponds to the user query according to a predetermined criteria. The system further contains apparatus for presenting the selected information segment to the user.

In another embodiment, the invention discloses a method of presenting information to the user, including the steps of receiving a user-defined query, selecting which of a plurality of predefined information segments corresponds to the query according to a predetermined criteria, and presenting the selected information segment to the user, in response to the query.

In yet another embodiment, the invention discloses a computer program product for use with a computer system having a user interface. The computer program product includes a computer useable media having program code embodiment in the medium for enabling a user to obtain information from the computer system with user-defined queries. The program code is responsive to the user-defined query and identifies a selected portion of the query. The program code further compares the selected portion of the query with a plurality of predefined information segments, and, selects which of the information segments corresponds to the query in accordance with a predetermined criteria.

BRIEF DESCRIPTION OF THE DRAWINGS

The above and other features, objects, and advantages of the invention will be better understood by referring to the following detailed description in conjunction with the accompanying drawing in which:

FIGS. 3A–C illustrate a graphic interface in accordance with the illustrative embodiment of the present invention;

FIGS. 4A–E are schematic illustrations of list-type data structures suitable for use with the present invention;

FIGS. 5A–C are schematic illustrations of array-type data structures suitable for use with the present invention; and FIGS. 6A–E form a composite flow chart illustrating the algorithmic steps of the present invention.

DETAILED DESCRIPTION

Figure 1:
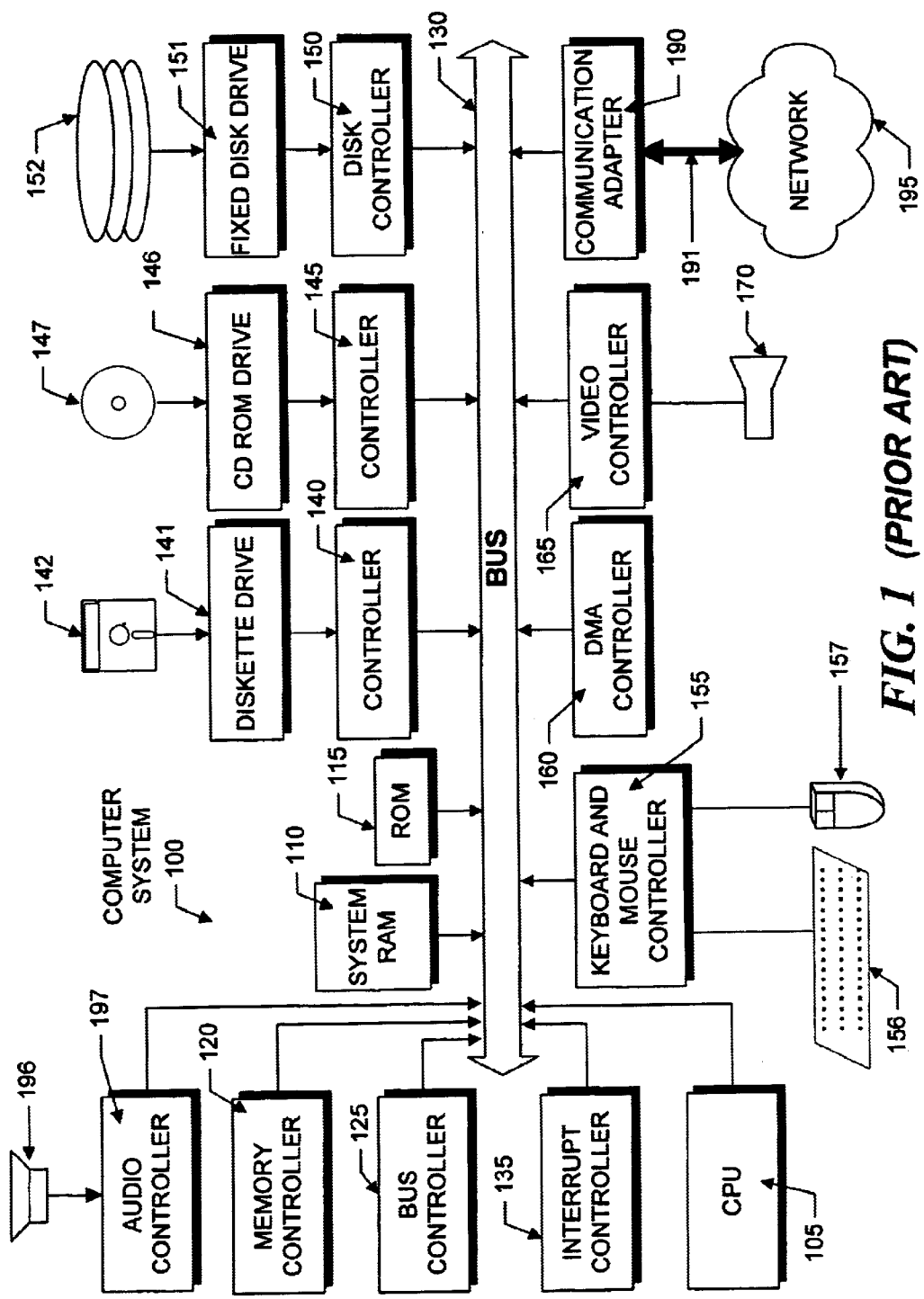
FIG. 1 is a block diagram of a computer systems suitable for use with the present invention.

FIG. 1 illustrates the system architecture for a computer system 100, such as an IBM PS/2® computer on which the invention may be implemented. The exemplary computer system of FIG. 1 is for descriptive purposes only. Although the description below may refer to terms commonly used in describing particular computer systems, such as an IBM PS/2 computer, the description and concepts equally apply to other systems, including systems having architectures dissimilar to FIG. 1.

Computer system 100 be implemented with a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. Bus 130 interconnects the components of computer system 130. A bus controller 125 is provided for controlling bus 130. An interrupt controller 135 is used for receiving and processing various interrupt signals from the system components.

Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tablet, may be connected to bus 130 an appropriate controller and software, as required. DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as process scheduling, memory management, networking, and I/O services, among other things.

Figure 2:
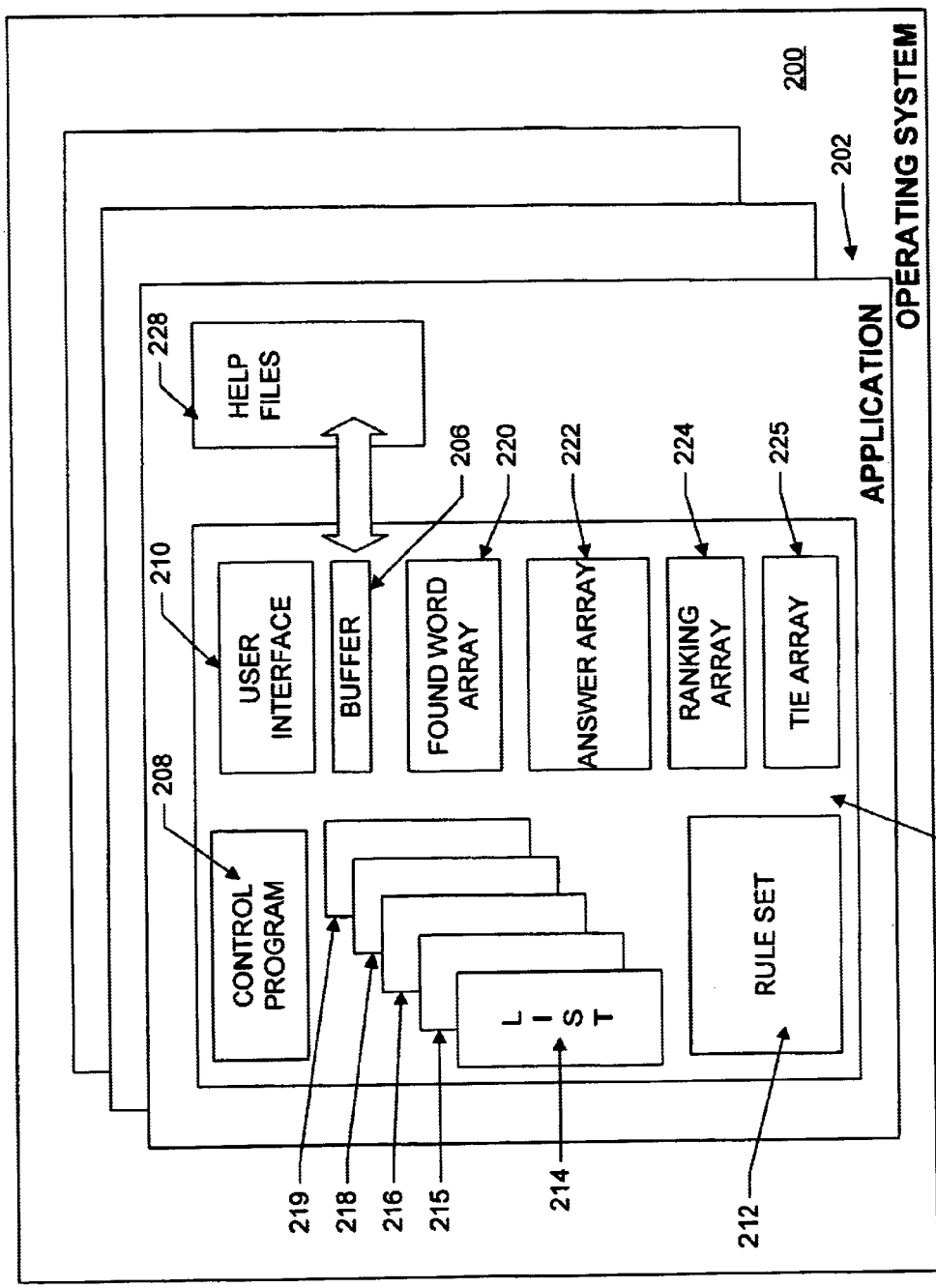
FIG. 2 is a schematic block diagram of the elements comprising the inventive user interface.

FIG. 2 illustrates schematically inventive natural language help interface 204 and its components, as well as other system elements with which the interface interacts. In particular, an operating system 200 resident in system memory and running on CPU 105 coordinates the operation of the other elements of computer system 100. The present invention may be implemented with any number of commercially available operating systems, including OS/2, UNIX, AIX, and DOS, etc. One or more applications 202 such as word processors, editors, spread sheets, compilers, etc., execute under the control of operating system 200. If operating system 200 is a true multitasking operating system, such as OS/2, multiple applications may execute simultaneously. Interface 204 may be implemented as an integral part of operating system 200, any of applications 202, or other software environment having a base of information available to the user. For example, interface 204 may be implemented as a standalone application, such as a tourist information program accessible at a kiosk. With such an implementation, interface 204 would access a base of information useful to tourists, rather than the help files 228 of FIG. 2.

Interface 204 comprises a buffer 206, control program 208, user interface 210, a rule set 212, a punctuation list 214, a noise list 215, a location list 216, a master word list 218, a base word list 219, a found word array 220, an answer array 222, a ranking array 224, and tie array 225. The structure and content of lists 214–219 are described with reference to FIGS. 4A–E, respectively, hereinafter. The structure and content of rule set 212 and arrays 220–225 are described with reference to FIGS. 5A–E, respectively, also described hereinafter. Finally, the algorithmic steps characterizing the interaction of control program 208 with the other components of interface 204 are described with reference to the flow charts of FIGS. 6A–D.

Control program 208 may be implemented in any number of computer programming languages, including C++ or other object-oriented type programming languages. To facilitate a better understanding of the operation control program 208, a description of the other components of interface 204 is provided below.

Figure 3A:
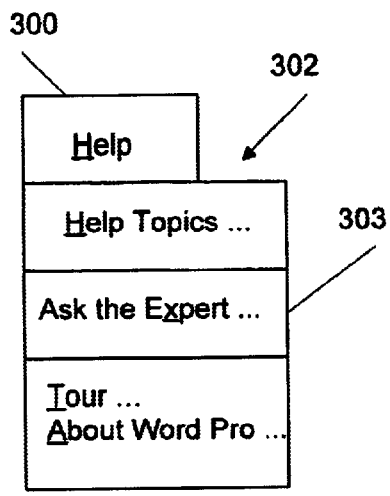
Figure 3B:
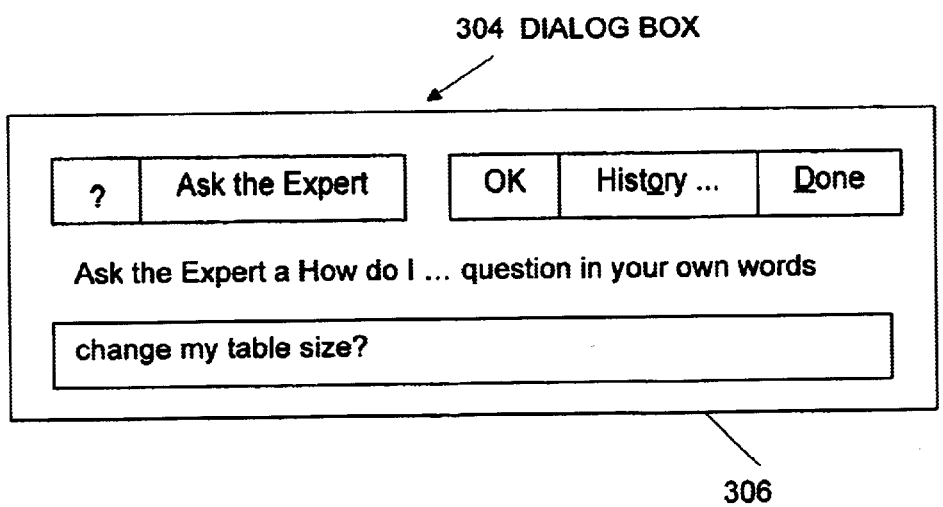

User interface 210 provides the mechanism through which a user executing an application can invoke the inventive interface. A user interface suitable for use with the present invention is illustrated in FIGS. 3A–C. The illustrated user interface is part of the Lotus Word Pro™, 96 Edition, a team word processing application, commercially available from Lotus Development Corp, Cambridge, Mass., a subsidiary of International Business Machines Corporation. In the illustrative embodiment, user interface 210 is implemented graphically in a manner be understood by those reasonably skilled in the arts. Such a graphic implementation may be part of a graphic user interface of the operating system or, as in the illustrative embodiment, part of an application. To invoke interface 204, the user selects, typically with a pointing device, a graphical help menu option 300, as illustrated in FIG. 3A. Upon selection, a drop-down menu 302 appears with further help options including an option 303 for invoking the inventive user interface, which, as illustrated in FIG. 3A, bears the legend "Ask the Expert." Upon selection of the option 303, a bar-shaped user interface 304 appears. Bar user interface 304 generally includes a number of graphic push buttons and a dialog box including an area 306 for the user to enter a query in natural language words or phrases, as illustrated. In the illustrative embodiment, the query is formatted in the form of a question prefaced with the phrase "How do I . . . ". As illustrated in area 306 of FIG. 3B, the user has queried in his/her own words "How do I change my table size." Queries are entered by moving the cursor to area 306 and entering a character string representing the query at the keyboard, followed by enter or selecting "OK."

Referring again to FIG. 2, the character string representing the user-defined query is read into and stored in buffer 206 under control of program 208. Buffer 206 may comprise an allocated area of memory large enough to hold even a complex user query in ASCII character format, for example. The character string representing the user-defined query will be dynamically modified within buffer 206 as the contents of lists 214, 215, 216, and 218, are compared to the contents of buffer 206 under the control of control program 208, as explained with reference to FIGS. 4A–E below.

FIG. 4A illustrates the format and content of punctuation word list 214 in accordance with the illustrative embodiment of the invention. Each entry of list 214 includes the character code for a punctuation mark such as ?, !, ", ', ., etc. To facilitate a better understanding of the invention, each entry is illustrated schematically with the actual punctuation marks, rather than their corresponding character codes, as will be similar with the descriptions of list 215, 216, 218 and 219. In the illustrative embodiment, the natural language used is English, however, it will be understood by reasonably skilled in the arts that any natural language such as Spanish, French, Italian, German, etc. may be used, as well as natural languages such as Japanese, Chinese, Korean, etc., which require double byte character set descriptions.

FIG. 4B illustrates the format and content of noise list 215. Each entry of list 215 includes the character string of a word which, although part of the user-defined query, will provide little value during the evaluation of the character string. Noise words in the English language typically include pronouns and articles, such as, it, the, that, this, and other words such as my, now, for, from etc., as illustrated in FIG. 4B. The entries of lists 214–215 are compared to the character string in buffer 206 to eliminate such punctuation and "noise" words in an attempt to identify meaningful words in the user-defined query, as will be explained with reference to FIGS. 6A–B.

Since the inventive interface is not limited to context sensitive help, the user may request assistance with tasks unrelated to the user's current location within the application. FIG. 4C illustrates the format and context of location list 216. Each entry of list 216 includes a single or multi-word character string, as well as an integer value. Each entry of list 216 serves as a template character string which, if found within the user-defined query, indicates that the user is inquiring as to an activity related to a specific location within the application or operating system. Accordingly, the entries in list 216 include such phrases as "from frame," "in table," "to image," etc., as illustrated. As will be explained in greater detail hereinafter, at the time of submission of the user-defined inquiry, a global LOCATION variable, typically implemented as an integer value, is initialized to a value indicating the user's current location within the application or operating system, or, to a location about which the user is enquiring, as with a standalone implementation. The location field in each entry of list 216 indicates a location to which the accompanying character string serves as a reference. Once a character string from list 216 has been identified within the user-defined query, the accompanying location field value associated with the character string is compared to the value of the global LOCATION variable, and, if they are different, the value of the LOCATION variable is set to the value associated with the entry of table 216, thereby indicating a query unrelated to the users current context.

FIG. 4D illustrates the format and content of the master word list 218. Each entry of list 218 includes a character string, representing either a single or a multi-word phrase, a verb field, indicating whether the character string is a verb or a non-verb, and a word number field representing the number of a base word to which the character string is associated.

In the illustrative embodiment, the term "verb" generally has the same meaning as found in the dictionary, i.e. Webster New Collegiate Dictionary, however, under limited circumstances, a word which frequently appears in the context of user-defined queries may be characterized by the interface author as a verb, even though grammatically such a word is not technically a verb. Such exception may be made at the discretion of the interface author. In the illustrative embodiment, list 218 is organized from top to bottom with the longer, multiple word character strings toward the top and the shorter, single word character strings toward the bottom. In a manner similar to list 214–216, the character strings in list 218 are compared to the user-defined character string in buffer 206 to identify any matches, as will be explained in greater detail with reference to FIGS. 6A–C. The structure of master word list 218 allows character strings to be inherently mapped to base words without a special mapping procedure. Each entry of master word list 218 includes a synonym of a base word or a phrase synonymous with a base word. For example, character string entries for such phrases as "get rid of," "take out," "remove," "nuke," and "deleting" are all associated with a word number value representing the base word "delete." In this manner, slang, jargon, and other user terminology are capable of being extracted from the user-defined query and associated with a smaller set of base words which, in turn, may be more efficiently associated with a large number of potential answers. As will be more fully described with reference to the flow charts of FIGS. 6A–C, the upper entries of master word list 218 containing multiple-word character strings are first matched against the user-defined character string of buffer 206. Once all multi-word character strings have been compared, the location related character strings from list 216 are compared against the single word entries in master word list 218 are compared with the remaining words in buffer 206. Any words remaining in buffer 206 after comparison with list 214, 215 216 and 218, are ignored.

FIG. 4E illustrates the format and content of a base word list 219. Each entry of list 219 includes a character string field, representing a base word, a word number field, implemented as an integer, and a verb field, typically implemented with a Boolean variable and indicating whether the base word is a verb or a nonverb. The words contained within the entries of list 219 are the words which have the greatest specific meaning to the potential answers in the help array 228. For example, entries of list 219 include such words as delete, change, move, tab, file, font, color, frame, etc. List 219 is used as a reference list for the word number fields and verb fields in each entry of master word list 218. As may be appreciated, multiple entries from list 218 may map to the same entry in base word list 219. A description of list 219 is included in the illustrative embodiment to facilitate a greater understanding of the invention. However, it will be understood by those reasonably skilled in the arts that an implementation of the inventive interface does not have to include base word list 219 for the other components of the invention to function, particularly where the size of the application or operating system is an issue.

Figure 5A:
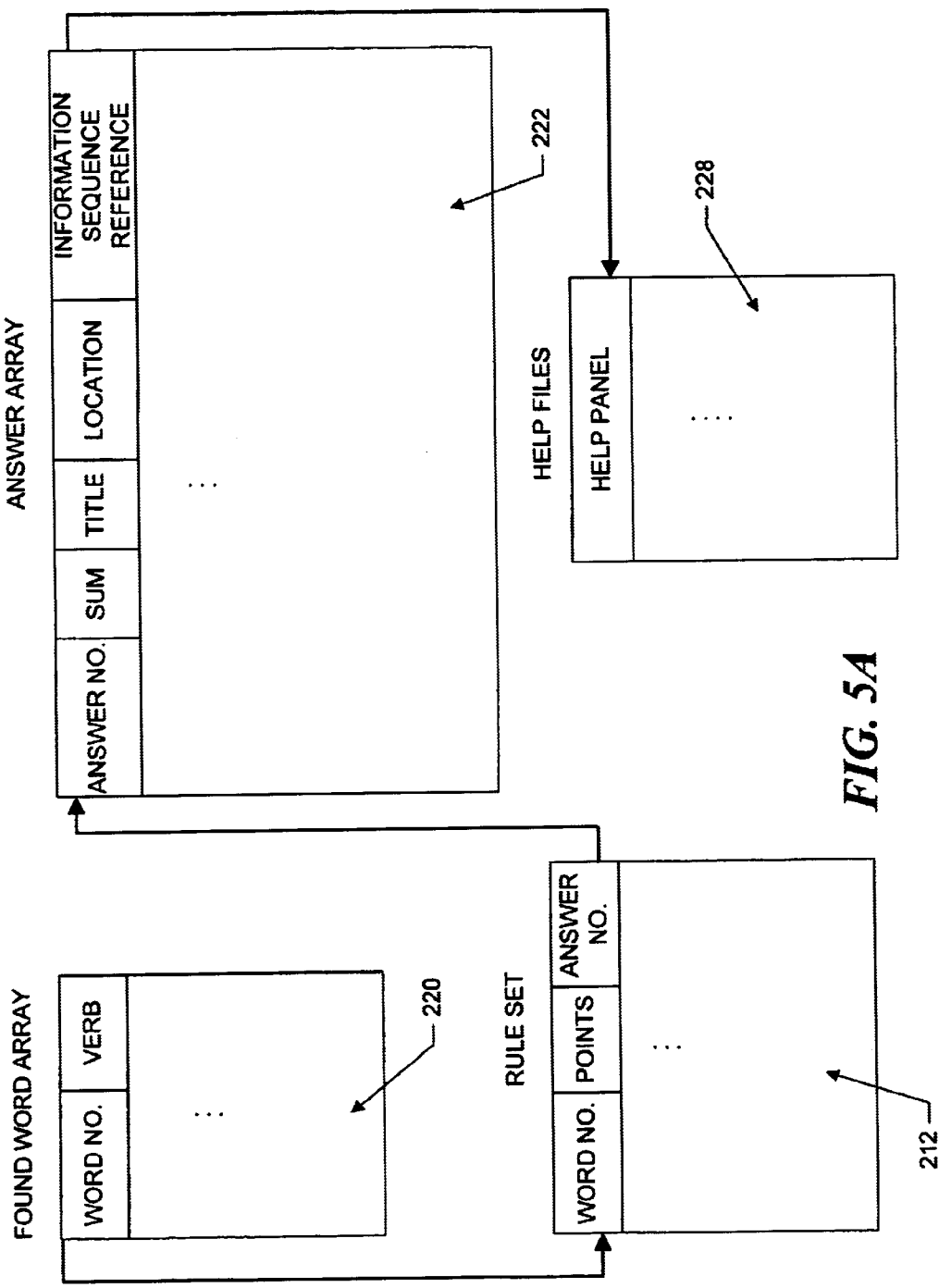

FIGS. 5A–C schematically illustrate the arrays and rule set used in the process of transforming the identified base words into the most appropriate answer to the user-defined query. In particular, FIG. 5A illustrates schematically the format and content of found word array 220, rule set 212, answer array 222, and help files 228, as well as references to the interrelationship of selected entries contained therein. Found word array 220 is used to store information relative to the base words extracted from the user-defined query. In particular, each entry of found word array 220 includes a word number field, similar to that in lists 218 and 219, and a verb field, also similar to that in each entry of lists 218 and 219. As will be described hereinafter, the word number fields serve as references into rule set 212, as indicated by the arrow interconnecting array 220 and rule set 212. The verb field values are used to determine the order in which the entries of array 220 are referenced into rule set 212.

In the illustrative embodiment, array 220 can be made as large as the largest anticipated set of extracted base words from a user-defined query. For even a complex query, an array of fifty entries is likely to be sufficient.

Rule set 212, as illustrated in FIG. 5A, serves as the primary mechanism for matching the base words from found word array 220 to all possible related answers. As illustrated, each entry of rule set 212 includes a word number field, a corresponding answer number field, and a point field, all of which may be implemented as integer variables. Rule set 212 may be organized according word number so that all answers related to a specific base word are grouped together contiguously within the rule-set. Each entry of rule set 212 contains, inherently, the comparative relationship between a specific base word and a candidate answer. For example, if a specific base word, as identified by the corresponding word number field, is very likely related to a specific answer number, the value of the point field will be set positively. Conversely, if a specific base word is not likely to be associated with a specific answer, as identified by the corresponding answer number field, the value of the points field will be set negatively. The actual point value scheme may be implemented with integer values in any increments or multiples desired, as will be understood by those reasonably skilled in the arts, at the discretion of the programmer.

As an example, if the word number field in array 220 identifies the base word "font," all entries in rule set 212 indexed by the base word font will have a positive point value associated with their corresponding answer number in the same entry. As a second example, if the word number field in array 220 identifies the verb base word "delete," all entries in rule set 212 indexed by the base word delete, whether the corresponding answer number has to do with a deletion of fonts, tabs, tables, etc., will have a positive value associated with the point field of the same indexed entries. Accordingly, each entry of rule set 212 matches an answer number with a word number and provides a point value which, as described hereinafter, will be used to calculate a cumulative score for the answer. It will be obvious to those reasonably in the arts that the size and values of the entries in a rule set 212 will be dependent upon the number of operations available to the user in the application or operating system, the number of entities upon which such operations may be performed, and the number of locations or contexts in which such operations may be performed. However, because software, in general, deals with a limited vocabulary and a limited number of procedures, a rule set, similar to that illustrated herein, may be derived with only limited empirical efforts. Similarly, with a standalone implementation of the inventive interface, such as the tourist information application, the number of potential locations and actions is similarly a limited set, and, a rule set similar to that disclosed herein may again be derived with only limited empirical efforts.

Answer array 222, as illustrated in FIG. 5A, is used to maintain the cumulative values for all answers, as well as other information relating to the answer. Specifically, each entry of answer array 222 includes an answer number field, a sum field, representing the total cumulative value of points scored by the answer, an answer title field, a location field, and an information segment reference field. The answer number field is similar in format and may have a same integer implementation as that of rule set 212. The sum field may likewise be implemented with an integer value. The answer title field may comprise a character string containing the title of the answer, as appropriate. The location field indicates for which locations within the application or operating system the answer is valid. The location field in each entry of answer array 220 may be implemented with a binary field, the size of which is dependent on the total number of possible locations. If the value of the binary field indicates a location which, either the user was in at the time of submitting the user-defined query, or, was modified through matching a character string from list 216, additional points will be added to the sum field of the same entry. The information segment reference field provides a reference to the actual text presented to the user in response to the query, i.e., the help panel. In particular, referring back to FIG. 3C, the actual text or help panel is presented in dialog box 310. In the illustrative embodiment, these information segments or help panels are stored in the help file 228. The answer title field in each entry of answer array 222 is presented in dialog box 308 of FIG. 3C. In the illustrative embodiment, the information segment reference field is implemented as a help panel number which can be indexed into help file 228.

It will be obvious to those reasonably skilled in the arts that the information segment reference may be implemented to serve as a reference or pointer to help information which is not necessarily contained within an application or operating system, but may be found elsewhere even at remote locations. For example, the reference field value may comprise a Universal Resource Locator (URL) reference indicating either a home page or a web site on the Internet or Worldwide Web which, if utilized in conjunction with a web browser application, could automatically access such help information for presentation to the user. In the illustrative embodiment, answer array 222 is large enough to contain an entry for each help panel in help file 228 with which the inventive interface 204 is associated.

FIG. 5B illustrates the content and format of ranking array 224. Ranking array 224 stores information on the highest ranking answers. In particular, each entry of ranking array 224 includes an answer number field and the sum field for the corresponding answer number. Under the control of program 208, the answer array 222 is traversed and sorted according to value of the sum fields for each answer number. In the illustrative embodiment, twenty answer numbers having the highest scoring sum values are entered into ranking array 224. The answer which is presented to the user through interface 210 is selected according to a number of rules as explained hereinafter.

FIG. 5C illustrates the content and format of tie array 225. Tie array 225 stores information useful in resolving the scenario in which the two highest ranking answers in ranking array 224 have equal sum field values. In particular, each entry tie array 225 includes two answer number fields, representing the answer numbers of the potentially tied answers and a best choice field which may be implemented with a Boolean variable, indicating which of the two answer number fields is the preferred of the two answers. Tie array 225 may be used in more than one manner to resolve tie situations as further described with reference FIG. 6E.

Having described the data structures and variables useful for implementing the illustrative interface 204, a description of the actual algorithmic process is described with reference to FIGS. 6A–E. The flow diagram as illustrated in FIGS. 6A–D are provided for the benefit of those reasonably skilled in the relevant arts, with trivial implementation details omitted for brevity.

Referring to FIG. 6A, inventive interface 204 remains idle until invoked, as illustrated by decision block 600. The user invokes the interface 204 by successively selecting menu option 300 and 302 of FIG. 3A. Upon invocation of interface 204, box interface 304 of FIG. 3B, is presented to the user, as represented by process step 601 of FIG. 6A. Box interface 304 remains idle until the user enters a query. As illustrated in FIG. 3B, the bar interface 304 may contain instructions illustrating the preferred format of the query. For example, in FIG. 3B, the user is instructed to "Ask the expert a 'How do I . . . ' question in your own words:." The user then enters a query in his or her own words, which in the illustrative embodiment, entails placing the cursor in dialog 306 of bar interface 304 and typing in the user request at the keyboard. The request may be echoed in dialog box 306 for user verification.

Upon entry of the user-defined query, the character string representing the query is written into buffer 206 under the control of program 208, as indicated by decision block 602 and process block 603 of FIG. 6A. Upon receipt of the user-defined query, a number of variables and array values are initialized to starting values. In particular, a global LOCATION variable is initialized to an integer value representing the current location of the user at the time the query was submitted, illustrated schematically by process block 604. In addition, found word array 220 and ranking array 224 are initialized to default values. The sum field in each entry of answer array 222 is initialized to zero. These initialization procedures are indicated schematically by process step 605 in FIG. 6A.

In process block 606, the character string representing the user-defined query in buffer 206 is parsed and a blank space added at the end of thereof. In the illustrative embodiment, the parsing algorithm searches the buffer for blank spaces to delineate a word or words within the buffer. The exact implementation of such parsing algorithms is at least partially dependent on the natural language with which the inventive help interface is designed to operate. For example, natural language is such as Japanese, Chinese, and Korean which require double byte character set implementations, may or may not contain spaces between characters. In such instances, the parsing algorithm will be designed accordingly, or, may be eliminated in its entirety, if unnecessary. Such algorithms are within the scope of those reasonably skilled in the art and will not be described in greater detail hereafter.

Next, a number of iterative processes are used to eliminate extraneous and superfluous words from the character string, as well as to identify words or phrases relevant to selecting the most appropriate response for the user's query. In particular, all punctuation marks peculiar to the user's natural language are first eliminated from the character-string in buffer 206. An entry from punctuation list 214 is compared to the character string in buffer 206, as illustrated by process 607, and, if a match is found, as illustrated by decision block 608, the character representing the punctuation mark is removed from the buffer and a blank space inserted in its place, as illustrated by process block 609. If a match does not occur for a particular entry of punctuation list 21, control program 208 determines whether more entries exist in the punctuation list and the next entry is compared against the character string remaining in the buffer. As will be understood by those reasonably skilled in the art, successive advancement through list 214 may be accomplished by initializing an entry count variable and pointer into variable list 214 and then incrementing and/or decrementing the entry count and pointer variable value appropriately to loop through list 214 in its entirety, a process represented schematically by decision block 610 of FIG. 6A. Once all entries of punctuation list 214 have been compared to the user-defined character string the remaining contents of the buffer will be free of any punctuation characters string, the remaining contents of the buffer will be free of any punctuation characters which are peculiar to the user's natural language.

In a similar manner, noise list 215, representing extraneous words, such as pronouns and articles in the English language, is compared to the remaining character string in buffer 206, as illustrated by blocks 611–614 of FIG. 6B. In block 611, an entry of noise list 215 is compared to contents of buffer 206 and, if a match is found, as illustrated by decision block 612, the corresponding character string representing the word is removed from the buffer and a blank space inserted in its place, as illustrated by process block 613. Using an entry count and a pointer in a manner similar to that described above, control program 208 successively loops through the entries of noise list 215 insuring that each entry is compared against the remaining character string in the buffer, as indicated by decisional block 614.

Master word list 218 has the form and content as described previously with reference to FIG. 4D. Each entry of list 218 may contain multiple word character strings or single word character strings with the multiple word character strings arranged according to length in descending order from the top of the list. First, all multiple word character strings within master list 218 are compared against the remaining contents of buffer 206. Thereafter, the location words in list 216 are compared to the remaining contents of the buffer, followed then by the single word character strings in the remaining portion of master word list 218, as described below.

As illustrated by process block 618, an entry of master word list 218 is compared with the remaining contents of buffer 206, and, if a match occurs, that character string is removed from the buffer and a space inserted in its place, as illustrated by decisional block 619 and process block 620. In addition, the value of the word number field of the matched entry in list 218 and the value of the verb field are written into an entry of found word array 200, as indicated by process block 621. The construction and content of found word array 225 is illustrated in FIG. 5A. Successive multiple words entries from list 218 are compared against the remaining contents of buffer 206 and subsequent matched entry fields from list 218 similarly written into found word array 225. A variable or flag may be appropriately implemented to determine whether more multiple word character strings remain in list 218, as indicated by decisional block 622. At this point all multiple word character strings have been matched against the remaining contents of buffer 206 and the inventive process jumps to a comparison of location list 216 against the remaining contents of the buffer.

Location list 216 has a format and content previously described with reference to FIG. 4C. In process block 604 of FIG. 6A a global LOCATION variable was set to value representing the current location of the user at the time the query was submitted. However, subsequent information in the user's query may indicate that the user is requesting information unrelated to the current location within the program or operating system. Accordingly, the remaining contents of buffer 206 are matched against the entries of location list 216 to identify references related to another location within the program. The character string fields within the entries of list 216 may include both single and double word character strings such as "from frame," "in table," "to image," as well as "equation," and "file." Each entry of list 216 further has associated with its character string field, a location field representing a location in the program or application. As illustrated in process block 623 of FIG. 6C, an entry from list 216 is compared with the contents of buffer 206, and, if a match occurs, the character string removed and a blank space inserted in its place, as illustrated by decisional block 624 and process block 625. In addition, the global LOCATION variable is set equal to the value of the location field from the matched entry of list 216, as illustrated in process block 626. In this manner, the initial location at which the user submitted the query is redefined according to the content of the user-defined query. Successive entries of location list 216 are compared to the remaining contents of buffer 206, under controller program 208, as indicated by decisional block 627 and in a manner similar to that of lists 214 and 215.

The remaining contents of the buffer are compared with single word character strings from master word list 218 in the same manner as the multiple word character strings from the same list. A single word character string entry of list 218 is compared with the contents of buffer 206, and, if a match is occurs, the character string is removed from the buffer in a blank space inserted in its place, as illustrated in process blocks 628, decisional step 629 and process block 630. In addition, the values of the word number field and the verb field of the matched entry of list 218 are written into found word array 225, as illustrated by process block 631. Successive entries of master word list 218 are compared to the remaining contents of buffer 206, under controller program 208, as indicated by decisional block 632 and in a manner similar to that of lists 214, 215 and 216.

Next, the buffer is reparsed for any non-blank spaces, as indicated by process block 615 and decisional block 616. If only blank spaces remain, a message is printed in dialog box 304 of FIG. 3B indicating that interface 204 is "Unable to answer your question," as represented by processes block 617. The inventive process then returns to block 602 to await further input from the user, as illustrated graphically by connector F in FIG. 6A.

At this point, all single and multiple word character strings, location information, noise words and punctuation have been removed from buffer 206. The remaining contents of the buffer are discarded, as illustrated by processes block 633.

Found word array 220 now contains entries indicating base word numbers and whether the base words are verbs or not. Control program 208 traverses array 220 to determine if any of the entries contain non-verbs, as illustrated by decisional block 634. If none of the entries in array 220 indicate non-verb values, control program 208 modifies the value of all verb fields in array 220 to indicate non-verbs, as illustrated by process block 635.

Rule set 212 has the form and content as previously described with reference to FIG. 5A. As indicated by procedural block 636 of FIG. 6D, an entry from word array 220 having a non-verb status is indexed, using the word number field of the entry into rule set 212. The value of the answer number of the indexed entry of rule set 212 is then used to index an entry in answer array 222, as indicated by process block 636A. The value of the points field from the entry in rule set 212 is added the sum field in the indexed entry of answer array 222, as illustrated by procedural block 637. The same entry from word array 220 is indexed into the next entry of rule set 212 as illustrated by decisional block 637A, until all entries of rule set 212 having the same word number field are mapped to their respective corresponding answers within answer array 222 and the pointer field values of the respective rule set entries added to the sum field of their corresponding answer numbers. The next non-verb entry of word array 220 is then indexed into rule set 212, as illustrated by decisional block 638, until all non-verb entries have been indexed into rule set 212 and their respective point field values added to the appropriately indexed sum field values in answer array 222.

Control program 208 searches the entries of found word array 220 for verb fields having a value indicating a verb value, as illustrated by decisional block 639. If no verbs are found, indicating the end of the array, process flow transfers to process block 644A, as illustrated and described hereafter. If word array 220 is found to contain a verb value, the corresponding entry is used to index rule set 212, as illustrated in process block 640 and 640A, in a manner described previously. However, once an appropriate entry in answer array 222, has been indexed, control program 208 first determines whether the value of the sum field associated with the indexed entry has a value greater than zero, as illustrated by decisional block 641. If the sum field has a value not greater than zero, the value is not modified and the next entry in rule set 212 is index into answer array 222, as illustrated by decisional block 642A. If however, the value of the sum field is greater than zero, the value of the points field from the indexing entry in rule set 212 is added to the existing value of the sum field in the indexed entry of answer array 222, as indicated by procedural block 642. This process continues through the remaining entries in rule set 212 and the remaining verb entries in word array 220 until all verb entries have been indexed into rule set 212, as indicated by decisional block 643, and all rule set entries for each verb have been indexed into answer array 222, as indicated by decisional block 642A. At this point, answer array 222, which has a structure and content similar to that described previously with regard to FIG. 5A, contains the cumulative sum field values for all answers in the array determined to be related to the user-defined query.

Next, additional points are added for those entries in answer array 222 whose answer number fields are valid for the location indicated by the value of the global LOCATION variable, and whose sum field values are greater than zero. As indicated by blocks 644A–C, each answer in array 222 is searched and the value of the sum field compared to zero. If the sum value of an answer array entry is greater than zero, the location field value of the entry is compared with the value of the global LOCATION variable, and, if the value matches, an additional predetermined point value is added to the sum field of the corresponding entry of answer array 222, as illustrated by decisional block 645 and procedural block 646 of FIG. 6E. If the location field value is not valid, the next entry of answer array 222 is compared with the global LOCATION variable, as illustrated by decisional block 647.

Next, all entries in answer array 222 are sorted according to the respective value of their sum fields, as illustrated in procedural block 648. In the illustrative embodiment, the entries are sorted in descending order and a predetermined number of the highest ranking entries stored in ranking array 224, as illustrated by procedural block 649. Ranking array 224 has the form and content as previously described with reference to FIG. 5B. Control program 208 evaluates the sum field of each entry in ranking array 224. If no sum field in array 222 has a value greater than zero, the program returns to word array 220 and modifies all verb fields of each entry to indicate non-verbs, the program then recomputes all of the sum fields in answer array 222 starting with process block 636, as illustrated by decisional block 650, procedural block 651 and connection E. If at least one sum field in array 224 has a positive value, the highest and next highest sum field values are compared to determine if a tie has occurred, as illustrated in decisional block 652. If the sum field values are not equal, the answer number entry having the highest corresponding sum field value ranking array 224 therefore represents the most responsive answer to the user-defined query.

The value of the answer number field of the highest scoring entry in array 224 is used as a reference back to the entry of answer array 222 containing the most responsive answer. The information segment reference field is then used to retrieve the actual text of the answer for presentation, as illustrated by process block 653. In the illustrative embodiment, the information segments comprise one or more help panels and, accordingly, the information segment reference may be implemented as a help panel number or other information used to access the appropriate help panel.

The title of the selected answer, as defined in the answer title field for the selected entry, and the retrieved information segment are then presented to the user. In the illustrative embodiment, the title of the answer is presented in dialog box 308 while the full text of the answer is presented in dialog box 310, both of FIG. 3C. In a similar manner, the titles only of the second, third, fourth, etc. . . . top ranking answers are displayed in dialog box 312 of FIG. 3C, as illustrated. These presentation processes are illustrated in FIG. 6E by process block 654.

In the event that the sum field values of the two top ranking entries of array 224 are equal, their respective answer numbers are indexed into an entry of the tie array 225, and compared to the best choice field, as indicated by block 655. As described previously, each entry of tie array 225 includes two answer number fields and best choice field indicating which of the two answer number fields is the preferred answer, in the event of a tie between the two answers. In this manner, tie array 225 acts as a rule set indicating which of the two answer numbers is likely to be the appropriate response. Such rules, may be, to a limited extent, derived empirically, but typically select the answer number of the response having more general applicability than the answer number of a response which is very specific. For example, an answer describing deletion of tabs will be preferred, in most instances, over an answer describing deleting tabs in a table, in the absence of any location reference to a table in the user-defined query.

After comparison to tie array 225 set the two top ranking answers may be reordered appropriately in ranking array 224, as illustrated by blocks 656 and 657. The top ranking answer data is then retrieved and displayed, as previously described.

An alternative tie-breaking option is to compare all of the top ranking answers in ranking array 224 with tie array 225. Depending on the order of consecutive entries in the ranking array 225, points are added to one or more answers accordingly. For example, the first and second, second and third, third and fourth, etc., answers in array 224 are compared and according to the value of the best choice field, additional point awarded to one of the answers. Next, the entries in the ranking array 224 are resorted in an attempt to obtain a single answer having the highest sum value.

A further alternative in the event of a tie, is to present the title only of all the highest ranking answers in consecutive order. It will be obvious to those reasonably skilled in the art that the manner in which a tie is resolved may affect the percentage of accuracy of the inventive interface.

Having defined the format and content of the variables, arrays, and lists useful in implementing the inventive interface, as well as the procedural flow executed by control program 208, additional minor implementation details not described herein are within the scope of understanding of those reasonably skilled in the arts.

The inventive interface described herein accepts queries in the user's natural language and is particularly well suited to be adapted to any of a number of natural languages in which users may interact with a computer system. For example, if the inventive interface was originally implemented to receive user-defined queries in the English language, the interface may be adapted to receive queries in another target natural language such as Spanish, Italian, etc., by merely modifying lists 214, 215, 216 and the character string fields in list 218. In particular, the punctuation of list 214 would be modified to include all punctuation characters peculiar to the targeted natural language. In a similar manner, noise list 215 would likewise be modified to contain entries considered to be noise words in the targeted natural language. Likewise, location word list 216 would be modified to contain single or multiple word character strings which reflect references to a location within the program, as would be expressed the targeted natural language. Finally, the multiple and single word character string entries in master word list 218 would likewise be modified to include words, phrases and terminology of the targeted natural language. However, the corresponding base word number field and verb fields in master word list 218 would not need to be changed. Similarly, base list 219, rule set 212, answer array 222, and control program 208 need no further modification for implementation in an other targeted natural language. Minor modifications may be necessary to the user interface 210. Natural languages such as Japanese, Chinese, and Korean, may require additional memory to accommodate double byte character set entries, in addition to the above described modifications. As such, the inventive rule set may be translated into a target natural language relatively easily and into subsequent additional natural languages with similar changes, as will be obvious to those reasonably skilled in the art.

Additionally, the inventive interface may be adapted to work with new or revised applications and/or operating systems by simply modifying the rule set and answer array appropriately. In particular, if new or different functions with corresponding answers are available in response to the user query, such answers would be added to rule set 212 and answer array 220, and any new base words or synonyms added to list 219 and list 218, as necessary.

Further, as previously mentioned, the information segment reference field of each entry in array 224 may be pointers or addresses to help panels located within the application itself or remotely over a computer network. Accordingly, with the appropriate addressing and linking scheme and browser software, the response to a user-defined query may include answers from Internet home pages or Web sites.

Additionally, the inventive interface may be implemented not only graphically, but also with voice recognition and speech synthesis hardware and software. In such an embodiment, the user may enter his query verbally with the appropriate voice recognition hardware and/or software. The appropriate response would be presented audibly to the user using appropriate voice synthesis technology, as would be understood by those reasonably skilled in the relevant arts, either alone or in combination with a graphic display.

Although several embodiments of the invention have been disclosed, it will be apparent to those skilled in the art that various changes and modifications can be made which will achieve some of the advantages of the invention without departing from the spirit and scope of the invention. These and other obvious modifications are intended to be covered by the following claims.

What is claimed is:

1. A computer program product for use with a computer system having a user interface, the computer program product comprising:
   a computer useable medium having program code means embodied in the medium for enabling a user to obtain information from the computer system with user-defined queries, the medium further comprising:
      program code means, responsive to user-defined query, for identifying a selected portion of the query;
      program code, responsive to the user-defined query, for determining a location in the computer system to which the user-defined query relates;
      program code means, responsive to the selected portion of the user-defined query, for comparing the selected portion of the user-defined query with a plurality of predefined information segments;
      program code means, responsive to the program code means for comparing, for selecting one of the plurality of information segments which best corresponds to the user-defined query in accordance with a predetermined criteria;
      program code means, responsive to the selected information segment, for presenting the selected information segment to the user through the user interface.

2. The computer program product of claim 1 wherein the user-defined query comprises at least one natural language word and wherein the program code means for identifying a selected portion of the user-defined query comprises program code means for identifying the natural language word.

3. The computer program product of claim 2 wherein the program code means for identifying further comprises program code means for associating the identified natural language word with a natural language base word.

4. The computer program product of claim 3 wherein the program code means for identifying further comprises program code means for classifying the base word as one of a verb base word and a non-verb base word.

5. The computer program product of claim 4 wherein the program code means for comparing the selected portion of the user-defined query further comprises program code means for comparing a non-verb base word with the plurality of information segments and for computing a value for the plurality of information segments according to a first predetermined criteria.

6. The computer program product of claim 5 wherein the program code means for comparing the selected portion of the user-defined query further comprises program code means for comparing a verb base word with only the information segments having a positive value as computed by the program code means for comparing non-verb base words.

7. The computer program product of claim 6 wherein the program code means for selecting one of the plurality of information segments further comprises program code means for ranking the plurality of information segments according to respective computed value and for selecting one of the plurality of information segments according to a second predetermined.

8. The computer program product of claim 7 wherein the second predetermined criteria comprises selecting, from the plurality of information segments, the information segment having the greatest computed value for presentation to the user.

9. The computer program product of claim 1 wherein the computer system further comprises a display and wherein the program code means for presenting comprises program code means for presenting the selected information segment graphically.

10. The computer program product of claim 1 wherein the computer system further comprises an audio transducer and wherein the program code means for presenting comprises program code means for presenting the selected information segment audibly.

11. An interface for user with a computer system comprising:
   a user interface for receiving a user-defined query;
   a memory for storing a plurality of predefined information segments and data representing a location last selected by the user in the computer system at time the user-defined query is submitted;
   means, responsive to the user-defined query, for selecting one of the predefined information segments which corresponds to the user-defined query according to a predetermined criteria and the location in the computer system to which the user-defined query relates; and
   means for presenting the selected information segment to the user.

12. The interface of claim 11 wherein the user-defined query comprises at least one natural language word and wherein the means for selecting further comprises means for identifying the natural language word.

13. The interface of claim 12 wherein the means for selecting further comprises:
   means, responsive to the identified natural language word, for comparing the natural language word with the plurality of information segments and assigning a value to the plurality of information segments according to a predetermined criteria.

14. The interface of claim 13 wherein the means for selecting further comprises:
   means, responsive to the assigned values of the information segments, for ranking the information segments according to the respective assigned value.

15. The interface of claim 14 wherein the predefined criteria comprises selecting, from the plurality of information segments, the information segment having the greatest assigned value.

16. The interface of claim 11 wherein the computer system further comprises a display and wherein the means for presenting further comprises means for presenting the selected information segment graphically.

17. The interface of claim 11 wherein the computer system further comprises an audio transducer and wherein the means for presenting further comprises means for presenting the information segment audibly.

18. In a computer system having a user interface, and a memory, a method of providing information to the user, the method comprising the steps of:
   A. receiving a query through the user interface, the query being defined by the user in a natural language;
   B. determining if the user-defined query relates to a location in the computer system other than a location last selected by the user at the time the user-defined query was submitted;
   C. selecting from the memory one of a plurality of predefined information segments which corresponds to the query in accordance with a predetermined criteria and any location data contained within the user-defined query; and
   D. presenting at least a portion of the selected information.

19. The method of claim 18 wherein step B comprises the steps of:
   B1. identifying at least one natural language word; and
   B2. comparing the at least one identified natural language word with a plurality of predefined information segments.

20. In a computer system having a user interface and plurality of predefined information segments stored in memory, a method of providing information to the user the method comprising the steps of:
   A. receiving a query through the user interface, the query being defined in a natural language;
   B. storing the user-defined query in a buffer;
   C. storing, in memory, data representing a location last selected by the user in the computer system at time the user-defined query is submitted;
   D. comparing the contents of the buffer to a predefined list of character strings;
   E. generating a list of references to all character strings found within the buffer;
   F. associating the character string references with a plurality of the predefined information segment;
   G. assigning a value to the plurality of predefined information segments in response to the comparison in step F;
   H. determining which of the predefined information segments has the value according to a predetermined criteria; and
   I. presenting the predefined information segment determined in step H to the user as a response to the query.

21. In a computer system having a user interface and plurality of predefined information segments stored in memory, a method of providing information to the user the method comprising:
   (A) receiving a query through the user interface, the query being defined in a natural language;
   (B) storing the user-defined query in a buffer;
   (C) storing, in memory, data representing a location last selected by the user in the computer system at time the user-defined query is submitted
   (D) comparing the contents of the buffer to a predefined list of character strings;
   (E) identifying and removing and characters from the buffer representing punctuation marks peculiar to the natural language;
   (F) generating a list of references to all character strings found within the buffer;
   (G) associating the character string references with a plurality of the predefined information segment;
   (H) assigning a value to the plurality of predefined information segments in response to the comparison in (G);
   (I) determining which of the predefined information segments has the value according to a predetermined criteria; and
   (J) presenting the predefined information segment determined in (I) to the user as a response to the query.

22. In a computer system having a user interface and plurality of predefined information segments stored in memory, a method of providing information to the user the method comprising:
   (A) receiving a query through the user interface, the query being defined in a natural language;
   (B) storing the user-defined query in a buffer;
   (C) storing, in memory, data representing a location last selected by the user in the computer system at time the user-defined query is submitted;
   (D) comparing the contents of the buffer to a predefined list of character strings
   (E) identifying and removing any character strings representing noise words from the buffer;
   (F) generating a list of references to all character strings found within the buffer;
   (G) associating the character string references with a plurality of the predefined information segment;
   (H) assigning a value to the plurality of predefined information segments in response to the comparison in (G);
   (I) determining which of the predefined information segments has the value according to a predetermined criteria; and
   (J) presenting the predefined information segment determined in (I) to the user as a response to the query.

23. In a computer system having a user interface and plurality of predefined information segments stored in memory, a method of providing information to the user the method comprising;
   (A) receiving a query through the user interface, the query being defined in a natural language;
   (B) storing the user-defined query in a buffer;
   (C) storing, in memory, data representing a location last selected by the user in the computer system at time the user-defined query is submitted;
   (D) comparing the contents of the buffer to a predefined list of character strings and identifying and removing any character strings representing references to a location to which the user defined query relates;
   (E) generating a list of references to all character strings found within the buffer;
   (F) associating the character string references with a plurality of the predefined information segment;
   (G) assigning a value to the plurality of predefined information segments in response to the comparison in (F);
   (H) determining which of the predefined information segments has the value according to a predetermined criteria; and
   (I) presenting the predefined information segment determined in (H) to the user as a response to the query.

24. In a computer system having a user interface and plurality of predefined information segments stored in memory, a method of providing information to the user the method comprising:

(A) receiving a query through the user interface, the query being defined in a natural language;

(B) storing the user-defined query in a buffer;

(C) storing, in memory, data representing a location last selected by the user in the computer system at time the user-defined query is submitted;

(D) comparing the contents of the buffer to a predefined list of character strings;

(E) identifying and removing any character strings from the buffer representing a synonym of one of the base words in the predefined list;

(F) generating a list of references to all character strings found within the buffer;

(G) associating the character string references with a plurality of the predefined information segment;

(H) at assigning a value to the plurality of predefined information segments in response to the comparison in (G);

(I) determining which of the predefined information segments has the value according to a predetermined criteria; and (J) presenting the predefined information segment determined in (I) to the user as a response to the query.

25. The computer program product of claim 3 wherein the identified natural language word is a synonym of the natural language base word.

* * * * *